(12) United States Patent
Fladhammer

(10) Patent No.: US 7,284,887 B2
(45) Date of Patent: Oct. 23, 2007

(54) SLIDING ADJUSTER

(75) Inventor: Scott Fladhammer, Racine, WI (US)

(73) Assignee: Asyst Technologies, LLC, Kenosha, WI (US)

( * ) Notice: Subject to any disclaimer, the term of this patent is extended or adjusted under 35 U.S.C. 154(b) by 0 days.

(21) Appl. No.: 11/222,503

(22) Filed: Sep. 8, 2005

(65) Prior Publication Data

US 2007/0053196 A1 Mar. 8, 2007

(51) Int. Cl.
*F21V 17/02* (2006.01)

(52) U.S. Cl. .................. 362/515; 362/421; 362/460; 362/528

(58) Field of Classification Search ............... 362/421, 362/460, 515, 528
See application file for complete search history.

(56) References Cited

U.S. PATENT DOCUMENTS

| | | |
|---|---|---|
| 417,516 A | 12/1889 | Shawhan |
| 4,309,740 A | 1/1982 | Takata |
| 4,674,018 A | 6/1987 | Ryder et al. |
| 4,737,891 A | 4/1988 | Burton |
| 4,922,387 A | 5/1990 | Ryder et al. |
| 4,939,945 A | 7/1990 | Ryder et al. |
| 4,965,706 A | 10/1990 | Reiland |
| 4,970,629 A | 11/1990 | McMahan |
| 5,186,532 A | 2/1993 | Ryder et al. |
| 5,214,971 A | 6/1993 | Burton |
| 5,251,114 A | 10/1993 | Cantin et al. |
| 5,343,372 A | 8/1994 | Shirai et al. |
| 5,355,287 A | 10/1994 | Denley |
| 5,390,089 A | 2/1995 | Denley |
| 5,390,098 A | 2/1995 | Reiland |
| 5,488,546 A | 1/1996 | Sato et al. |
| 5,526,238 A | 6/1996 | Van Oel et al. |
| 5,539,625 A | 7/1996 | Turley, Jr. et al. |
| 5,642,935 A | 7/1997 | Schmitt |
| 5,669,695 A | 9/1997 | Parker et al. |
| 5,697,692 A * | 12/1997 | Hoffman et al. ............ 362/460 |
| 5,707,133 A | 1/1998 | Burton |
| 5,735,656 A | 4/1998 | Marvell et al. |
| 5,762,415 A | 6/1998 | Tolley |
| 5,775,795 A | 7/1998 | Christian et al. |
| 5,897,202 A | 4/1999 | Denley |
| 5,906,431 A | 5/1999 | Chianale et al. |
| 5,971,574 A | 10/1999 | Taniuchi |
| 5,993,032 A | 11/1999 | Herbers |
| 6,050,712 A | 4/2000 | Burton |
| 6,234,655 B1 * | 5/2001 | Suehiro et al. ............ 362/515 |
| 6,257,747 B1 | 7/2001 | Burton |
| 6,450,674 B2 * | 9/2002 | Denley ...................... 362/512 |

(Continued)

OTHER PUBLICATIONS

Photographs and part drawings of adjuster used in a 1999 Mercury Cougar vehicle.

*Primary Examiner*—Sandra O'Shea
*Assistant Examiner*—Mary Zettl
(74) *Attorney, Agent, or Firm*—Brian G. Gilpin; Godfrey & Kahn, S.C.

(57) ABSTRACT

A lamp adjuster for adjusting the aim of a headlamp is disclosed. The lamp adjuster includes an input shaft, a ball stud bracket in threaded engagement with the input shaft and an o-ring mounted on the ball stud bracket. Rotation of the input shaft causes linear translation of the ball stud bracket, thereby adjusting the aim of the lamp.

13 Claims, 5 Drawing Sheets

U.S. PATENT DOCUMENTS

| | | |
|---|---|---|
| 6,474,850 B1 | 11/2002 | Burton |
| 6,568,837 B2 | 5/2003 | Denley |
| 6,913,374 B2 | 7/2005 | Burton |
| 6,979,109 B2 * | 12/2005 | Burton ........................ 362/460 |
| 7,004,607 B2 * | 2/2006 | Aguinaga ................... 362/528 |
| 2004/0151005 A1 * | 8/2004 | Cramer et al. .............. 362/528 |
| 2005/0083707 A1 | 4/2005 | Burton |
| 2005/0231967 A1 * | 10/2005 | Hobbs et al. ................ 362/460 |
| 2005/0276060 A1 * | 12/2005 | Brazas ........................ 362/512 |
| 2006/0209554 A1 * | 9/2006 | Chen ........................... 362/512 |

* cited by examiner

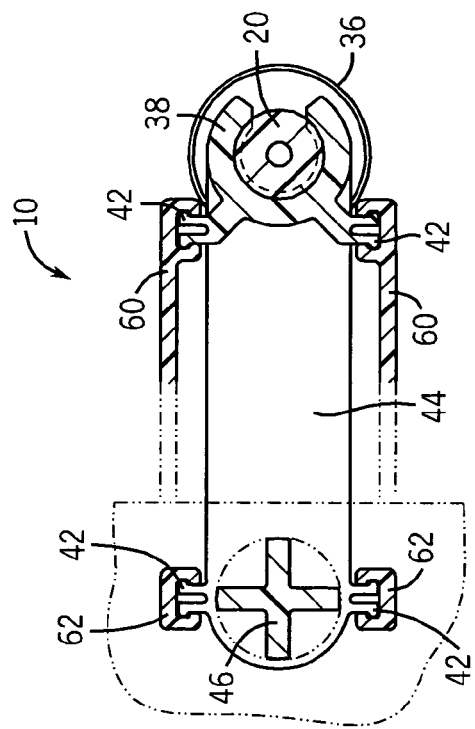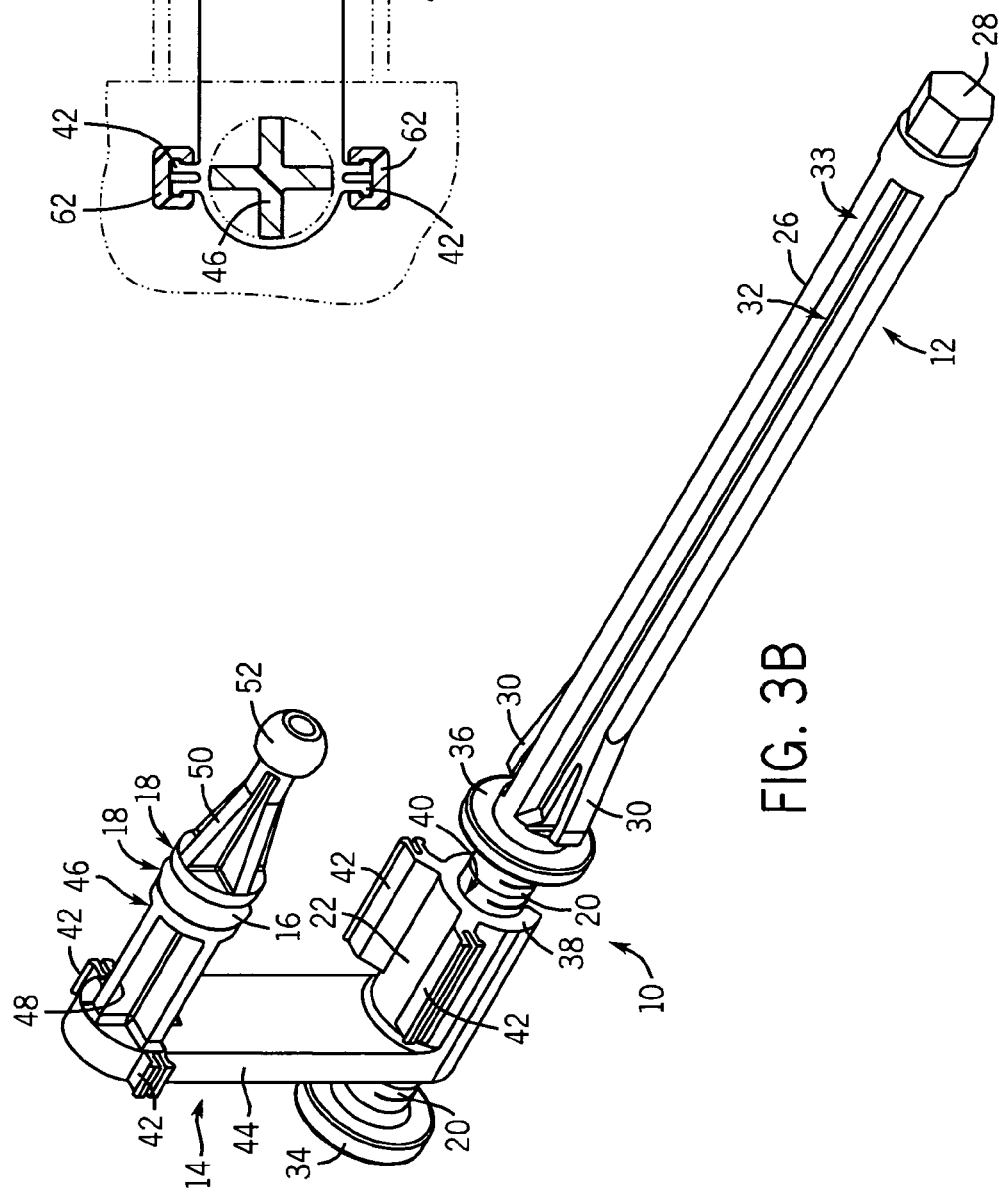

SLIDING ADJUSTER

BACKGROUND OF THE INVENTION

This invention relates generally to adjuster mechanisms for lamp assemblies. Specifically, this invention relates to a sliding headlamp adjuster mechanism for use in motor vehicles.

In traditional sealed beam style headlamps, the lamp's aim is adjusted by rotating one or more screws that hold the frame of the lamp to the vehicle. Such adjustment is made from the front of the vehicle by inserting a screwdriver or the like between the lamp frame and the vehicle trim and turning the screws to alter the orientation of the lamp and effectuate the desired adjustment. As the design of motor vehicles has evolved, headlamps have continually been reconfigured to improve the aerodynamics and styling of the front end of the vehicle. Modern headlamps are designed so that their lenses follow the contour of the vehicle to provide an aerodynamically efficient exterior surface. Adjustment of these headlamps must still be performed in order to provide an optimal beam of light and to prevent the aiming of light beams toward oncoming vehicles. Such adjustment is made by moving a reflector within the lamp assembly so that light is directed in the desired manner. Automotive manufacturers' demand for aerodynamically efficient headlamp designs has lead to modular designs where the headlamp adjustment mechanism is located within the interior of the engine compartment and positioned such that adjustment can be easily performed without removing any trim pieces. Thus, the constraints of the installation area and the demands of the automobile manufacturers for aerodynamic headlamp designs dictate the location from which adjustment must be made.

There are many adjuster devices designed for use in connection with aerodynamic headlight designs including, among others, the devices disclosed in U.S. Pat. Nos. 5,707,133 and 5,214,971 to Burton. Modern automotive headlamp assemblies typically include several basic parts: a housing or support frame, a reflector, a lens, a bulb, and one or more adjusters. The support frame houses the reflector and the bulb on a pivotable mounting to allow the aim of the light to be adjusted using the adjusters and provides a mounting surface for attaching adjusters. The lens seals the front of the support frame to protect it from the elements assailing the front end of the vehicle and provides an aerodynamic shape and attractive appearance. The reflector mounts on one fixed ball joint and is adjustable horizontally and vertically using adjusters that interface with the reflector through moving ball joints. The moving ball joints are moved by actuating the adjusters connected to the moving ball joints by a ball stud. Geared angle style adjusters, such as the ones disclosed in the referenced Burton patents, are often used to adjust the aim of the headlamp. However, such devices are designed to allow adjustment of the headlamp from a location behind the assembly, typically from within the engine compartment and immediately behind and above the lamp assembly. Accordingly, such devices cannot be effectively used in vehicles where the area immediately behind and above the lamp assembly is not accessible. One such vehicle design is shown in FIG. 1. In that design, the vehicle fender 23 covers the headlamp assembly 24 rendering the area behind and above the assembly substantially inaccessible without removal of the fender 23 of the vehicle. The area below the headlamp assembly 24 is similarly inaccessible because of the bumper 25 and other vehicle components. Thus, existing geared angle style headlamp adjusters have not been found to be effective for use in such vehicle designs.

Conventionally in a vehicle such as the one shown in FIG. 1, a sealed beam style headlamp is used. However, due to consumer and vehicle manufacturer styling preferences and performance objectives, it is desirable to use a reflector style headlamp in such vehicles. The conventional method for adjusting sealed beam lamps cannot be used to adjust a reflector style lamp and the area immediately above and behind the lamp is inaccessible such that a conventional geared angle style adjuster cannot be used. Thus, headlamp adjusters have been developed that can be used in connection with a vehicle design where the area behind and above the lamp assembly is substantially inaccessible and the use of a reflector style lamp is desired. For example, U.S. Pat. No. 6,474,850 and U.S. Patent Application Publication No. 2003/0002290, both to Burton, disclose a sliding style headlamp adjuster that can be used in connection with such vehicle designs. While the Burton adjusters are very effective for this purpose and serve some applications very well, they can be more expensive to manufacture and install than is desired for other applications. In particular, some applications require a minimum number of pieces to assemble, inexpensive and lightweight materials, and a minimum number of assembly steps.

Accordingly, a need exists for an improved lamp adjuster that solves these and other deficiencies in the prior art. Of course, the present invention may be used in a multitude of situations where similar performance capabilities are required.

SUMMARY OF THE INVENTION

The present invention provides a lamp adjuster that is cost-effective, provides improved functionality, and which solves certain of the problems raised or not solved by existing designs. The lamp adjuster of the present invention includes an input shaft, a ball stud bracket in threaded engagement with the input shaft and having a main body, a shaft bracket disposed at a first end of the main body, and a ball stud extension disposed at a second end of the main body. The shaft bracket and ball stud extension are preferably integrally formed on the ball stud bracket. Rotation of the input shaft causes linear translation of the ball stud extension in a direction parallel to a longitudinal axis of the input shaft, thereby adjusting the aim of the lamp.

The present invention also contemplates a lamp assembly. The lamp assembly of the present invention includes a housing including an integrally formed walled opening and a plurality of integrally formed mounting tabs, a lens supported by the housing, a reflector supported by the housing, a bulb disposed between the lens and the reflector, and an adjuster functionally engaged to the reflector. The adjuster includes an input shaft and a ball stud bracket, wherein the ball stud bracket is secured within the walled opening of the housing and the input shaft and ball stud bracket are supported by the plurality of mounting tabs. The adjuster can be secured in place using a snap feature on the input shaft.

The adjuster and lamp assembly of the present invention have several advantages over existing adjusters and lamp assemblies. Most significantly, the use of a single ball stud bracket that combines the ball stud extension and shaft bracket into a single piece reduces the number of parts required, and the use of mating features on the lamp assembly housing and a snap feature on the input shaft allows for more efficient installation of the adjuster into the lamp assembly.

While one possible application of the present invention is in connection with a vehicle lamp, many other applications are possible and references to use in connection with a vehicle lamp should not be deemed to limit the uses of the present invention. The terms used herein should not be interpreted as being limited to specific forms, shapes, or compositions. Rather, the parts may have a wide variety of shapes and forms and may be composed of a wide variety of materials. These and other objects and advantages of the present invention will become apparent from the detailed description, claims, and accompanying drawings.

DESCRIPTION OF THE DRAWINGS

FIG. 3B is a perspective view of an adjuster in accordance with one embodiment of the present invention;

FIG. 7 is a cross-sectional view of the adjuster of FIG. 3B installed in a headlamp assembly, taken along plane 7-7 in FIG. 5.

DETAILED DESCRIPTION OF THE PREFERRED EMBODIMENTS

Figure 1:
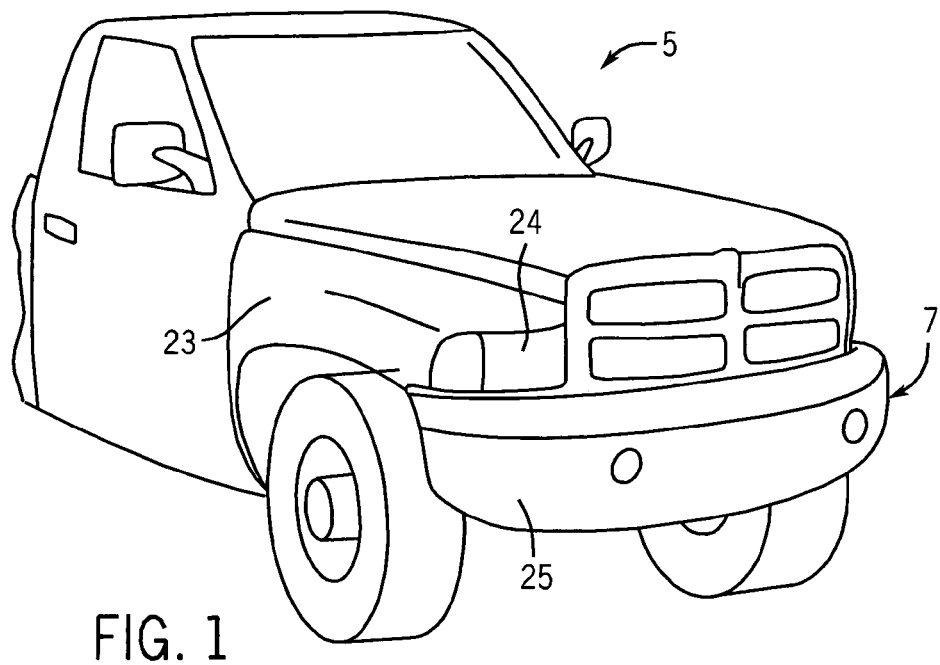
FIG. 1 is a perspective view of a vehicle with which a sliding headlamp adjuster in accordance with the present invention might advantageously be used.

Referring now to FIGS. 2-7, an adjuster 10 according to one embodiment of the present invention includes an input shaft 12, a ball stud bracket 14 and an o-ring 16. The o-ring 16 seats into a mating recess 18 on the ball stud bracket 14, and a threaded portion 20 of the input shaft 12 press-fits on to a preset position on a shaft bracket 22 of the ball stud bracket 14. The shaft bracket 22 and threaded portion 20 of the input shaft 12 are in threaded engagement such that rotation of the input shaft causes linear translation of the ball stud bracket 14 in a direction parallel to the input shaft 12. The adjuster 10 of the present invention is suitable for use with vehicles such as the vehicle 5 shown in FIG. 1 because the adjuster 10 can be operated from the front 7 of the vehicle 5.

Figure 2:
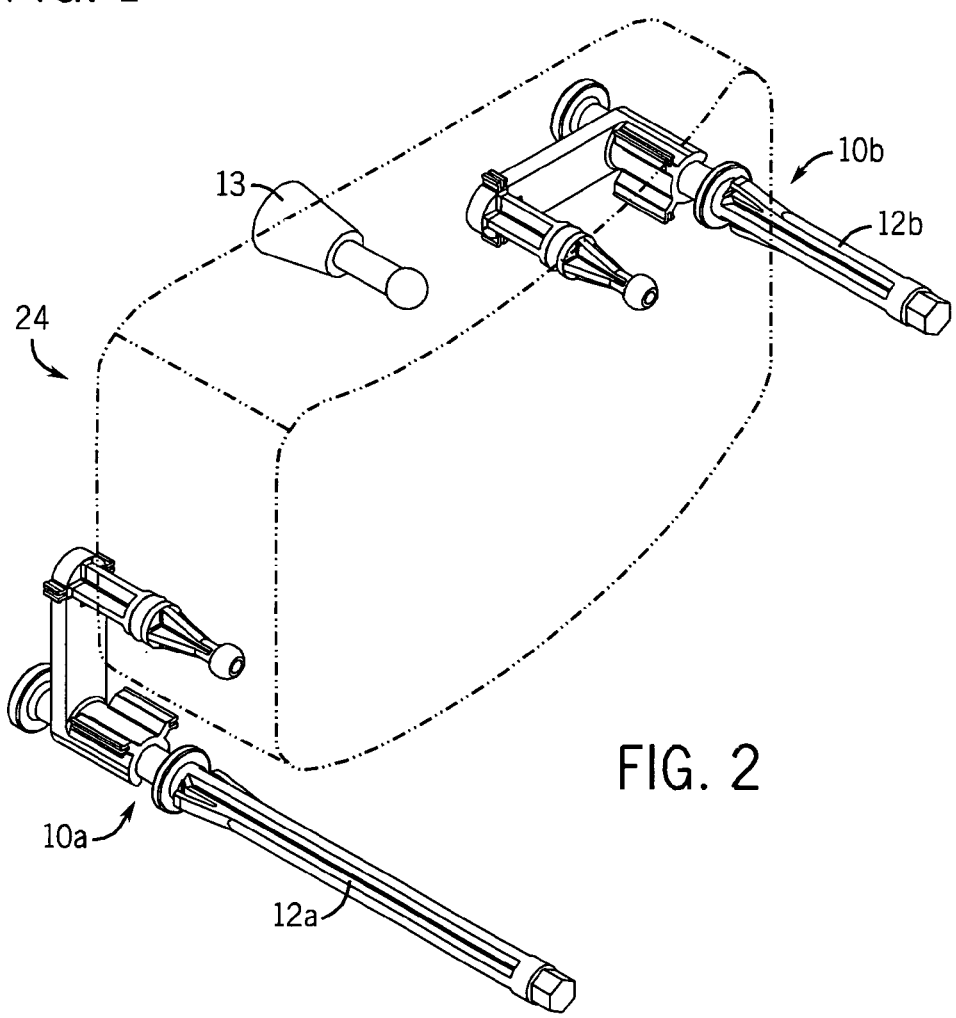
FIG. 2 is a perspective view of two adjusters in accordance with one embodiment of the present invention, installed in different orientations with respect to a headlamp with the headlamp shown in phantom.
Figure 3A:
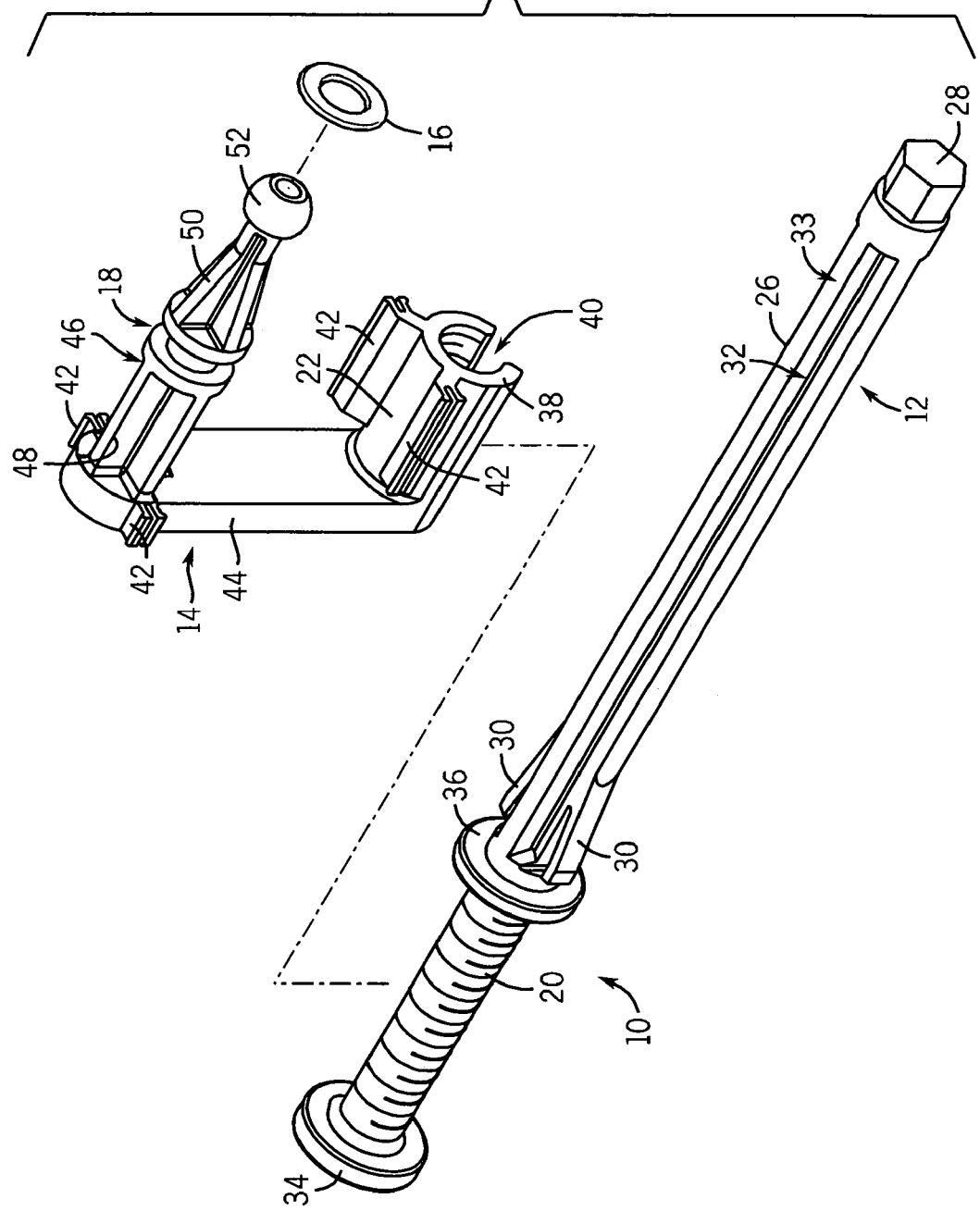
FIG. 3A is an exploded perspective view of the adjuster of FIG. 3B.
Figure 4:
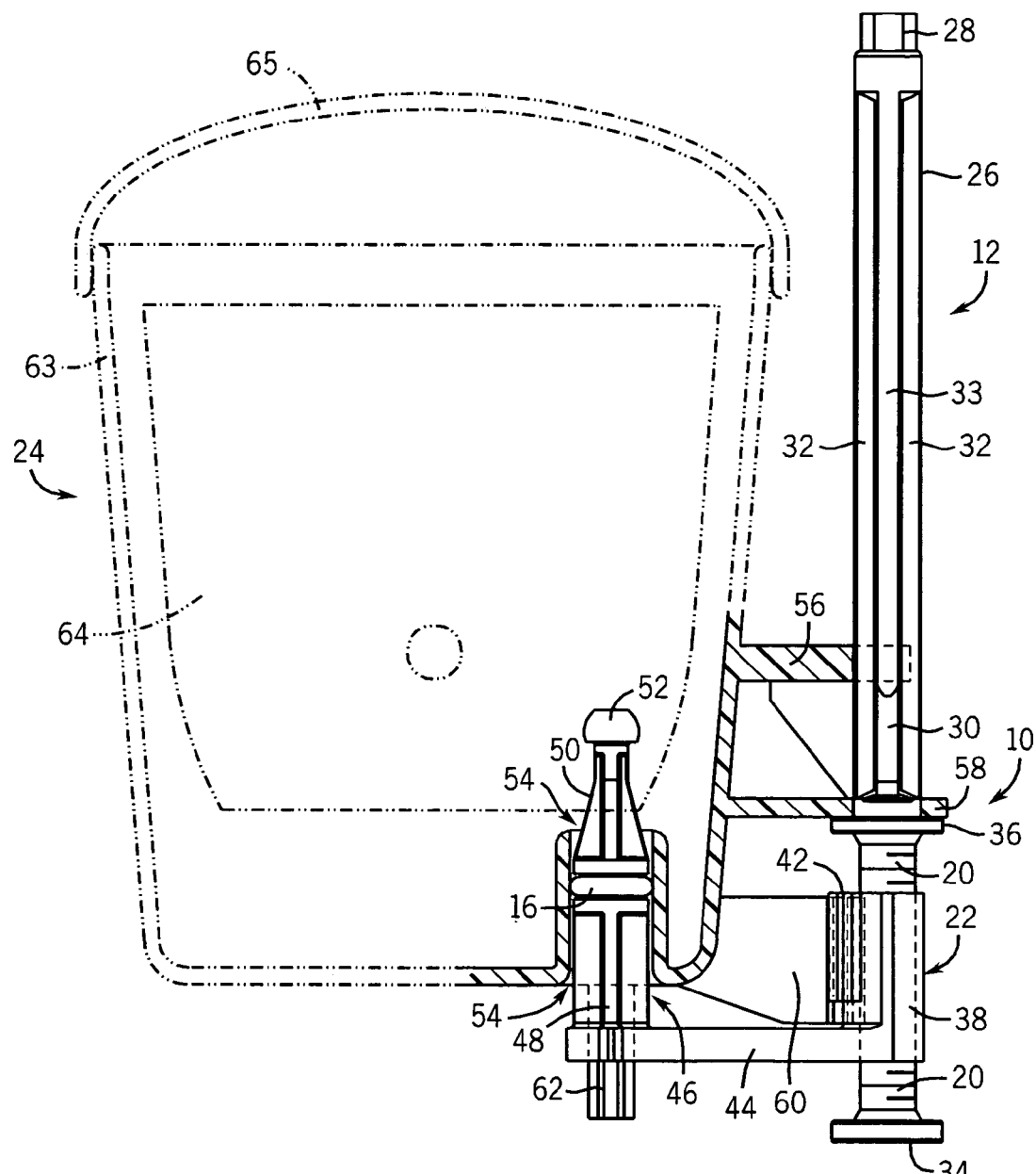
FIG. 4 is a side view of the adjuster of FIG. 3B installed in a headlamp assembly with a portion of the headlamp assembly shown in phantom.
Figures 5, 6:
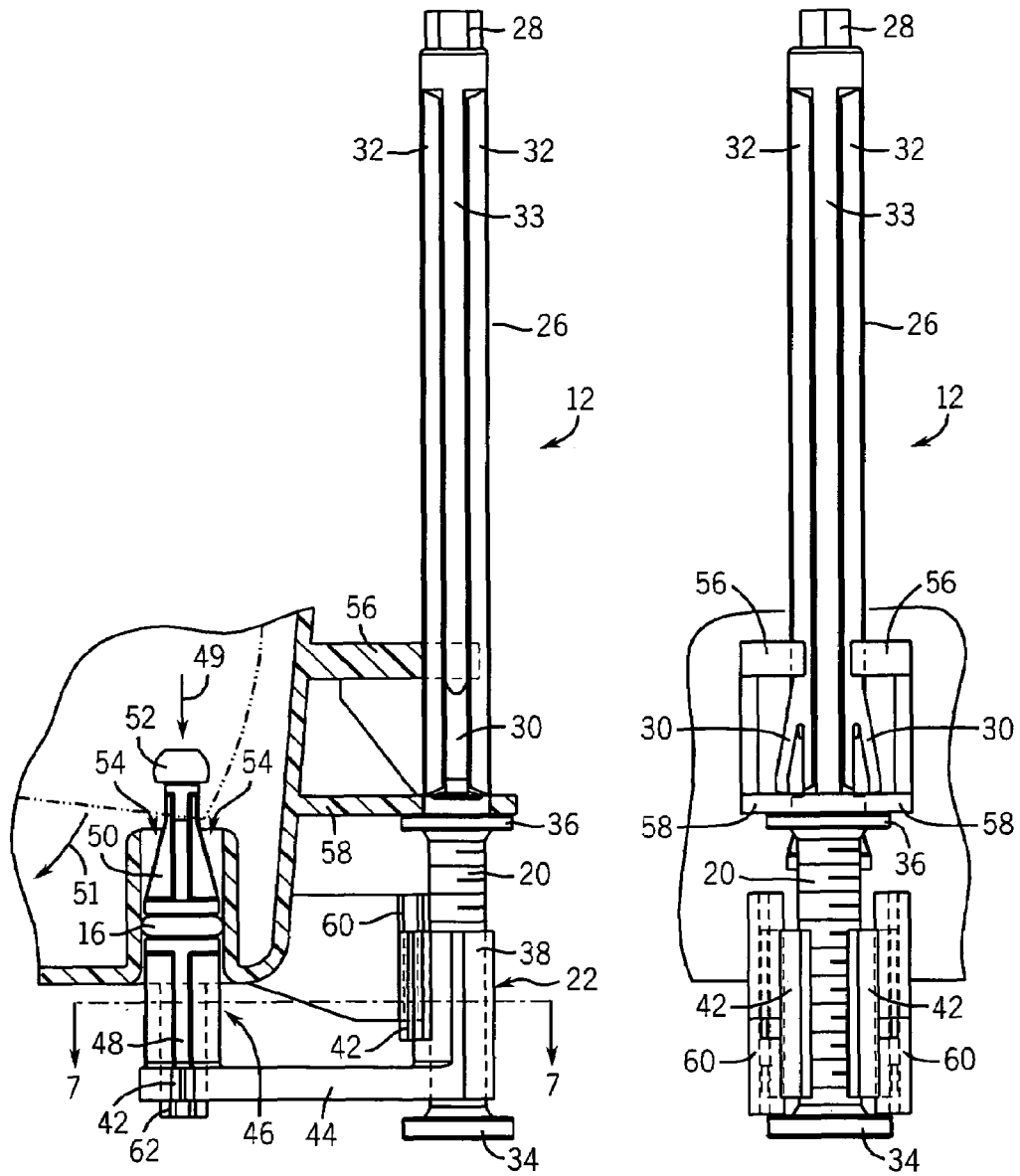
FIG. 5 is a side view of the adjuster of FIG. 3B installed in a headlamp assembly with a portion of the headlamp assembly shown in phantom, illustrating the operation of the adjuster.
FIG. 6 is a bottom view of the adjuster of FIG. 3B installed in a headlamp assembly.

As well, as shown in FIG. 2, the adjuster 10 of the present invention can be installed in a number of different orientations with respect to headlamp assembly 24. For example, in FIG. 2, adjuster 10a is installed to facilitate vertical adjustment of the headlamp assembly 24, and adjuster 10b is installed to facilitate horizontal adjustment of the headlamp assembly 24. Both adjusters 10a and 10b can be operated from the front of the headlamp assembly 24, as shown by the position of the input shafts 12a, 12b. The adjusters 10a, 10b also have input shafts 12a, 12b of different lengths, illustrating that the adjuster 10 of the present invention can be adapted to accommodate a number of different vehicle configurations. In FIG. 2, a single fixed pivot point 13 in the form of a ball joint is shown used in connection with the horizontal and vertical adjusters 10a and 10b. If a single adjuster 10 is used, such as only a vertical adjuster, the lamp assembly would require a second fixed pivot point (not shown) for accurate adjustment.

The various parts of the adjuster 10 of the present invention are shown in more detail in FIGS. 3A-7. The input shaft 12 includes a drive extension 26 with a drive head 28 disposed at one end thereof and a snap feature 30 disposed at the other end thereof. The drive extension 26 can include longitudinal grooves 32 and protrusions 33 as shown, or can be of any other desired configuration. The input shaft 12 also includes a threaded portion 20 with a pair of plates 34, 36 at each end. Plate 36 separates the drive extension 26 from the threaded portion 20. Plates 34, 36 also act as stops to control the travel of the ball stud bracket 14 along the input shaft 12.

Referring still to FIGS. 3A-7, the ball stud bracket 14 includes a main body 44 with shaft bracket 22 disposed at one end and a ball stud extension 46 disposed at the other end thereof. The shaft bracket 22 has an arcuate section 38 with a threaded interior surface 40. The shaft bracket 22 also includes channel supports 42 that help keep the adjuster fastened to the headlamp assembly 24, as described in more detail below. As well, the shaft bracket 22 includes a clutching feature. When the shaft bracket 22 hits one of the plates 34, 36 or is otherwise subject to excessive resistance to linear movement, the shaft bracket 22 will flex outwardly and disengage from the input shaft 12, thus acting as a clutching feature to prevent damage to the adjuster 10 or headlamp assembly 24. The ball stud extension 46 includes a first end 48 that extends from the main body 44 to a tapered second end 50 supporting a ball stud 52. The mating recess 18 for o-ring 16 is formed between the first end 48 and second end 50 of the ball stud extension 46. The ball stud extension 46 shown in FIGS. 3A-7 is formed to have an X-shaped cross section, as shown best in FIG. 7; however, other configurations could also be used. The ball stud bracket 14 also includes two channel supports 42 aligned with the ball stud extension 46 that help keep the adjuster aligned in the headlamp assembly 24, as described below.

The adjuster 10 of the present invention easily snaps into a mating feature on the headlamp assembly 24, as is best shown in FIGS. 4-7. The headlamp assembly 24 includes a housing 63, reflector 64, lens 65 and a bulb (not shown) disposed between the reflector 64 and lens 65. The housing 63 of the headlamp assembly 24 used in connection with the adjuster 10 of the present invention can be manufactured to include the mating feature, which includes a walled opening 54 for receiving the ball stud extension 46, and a plurality of external mounting support features for the adjuster 10. As shown, a first mounting tab 56 supports the drive extension 26 of the input shaft 12, a second mounting tab 58 is the main support for the input shaft 12, a third mounting tab 60 supports the shaft bracket 22, and a fourth mounting tab 62 supports the ball stud extension 46. The mounting tabs 56, 58, 60, 62 can be separate, independent tabs or can be connected to one another to facilitate ease of manufacture and improve the support capabilities of the tabs. To install the adjuster 10, the adjuster is aligned with each of the mounting tabs 56, 58, 60, 62 and pressed into position until the ball stud 52 functionally engages the reflector 64 or other appropriate portion of the headlamp assembly 24 and the snap feature 30 of the adjuster 10 is snapped through the second mounting tab 58 and locked into place. When locked into place, the first mounting tab 56 mates with the grooves 32 and protrusions 33 on the drive extension 26, the third mounting tab 60 mates with the channel supports 42 on the shaft bracket 22, the fourth mounting tab 62 mates with the channel supports 42 on the main body 44 of the ball stud bracket 14, and the o-ring creates a seal between the walled opening 54 and the ball stud extension 46. The adjuster 10 is thus easily installed and securely locked into place in one installation step.

Once installed, the adjuster 10 can be used to adjust the headlamp 24. An operator can use a driver (not shown) to engage and turn the drive head 28 of the input shaft 12, which is axially fixed by mounting tabs 56, 58 but free to rotate. The drive head 28 can be adapted to accommodate a variety of drivers, including screwdrivers, Phillips® head drivers, and TORX® head drivers. The rotation of the input shaft 12 causes the ball stud bracket 14, which is restricted from rotation by mounting tabs 60, 62 and in threaded engagement with the input shaft 12, to translate linearly in a direction parallel to the longitudinal axis of the input shaft 12 as shown by arrow 49 in FIG. 5. Arrow 49 shows the direction of travel when the input shaft 12 is rotated in a counter-clockwise direction, however, the ball stud bracket 14 can move in the direction opposite to that shown by arrow 49 when the input shaft 12 is rotated in a clockwise direction. The ball stud extension 46 thus moves forward and backward within the walled opening 54, thereby adjusting the aim of the headlamp assembly 24 as shown, for example, by arrow 51 in FIG. 5. As previously discussed, the adjuster 10 also includes a clutching feature. If the shaft bracket 22 hits one of the plates 34, 36 or is otherwise subjected to excessive linear resistance, the shaft bracket 22 will flex outwardly and disengage from the input shaft 12, thus acting as a clutching feature to prevent damage to the adjuster 10 or headlamp assembly 24.

The input shaft 12 and ball stud bracket 14 can be manufactured from a plastic material, making them very lightweight and inexpensive to produce. Other materials could also be used, such as metal materials, but lightweight and inexpensive materials are preferred. The o-ring can be manufactured from a number of different materials, including rubber and silicone materials.

The adjuster 10 of the present invention may have other applications aside from use in connection with vehicle lamp assemblies. Although the invention has been herein shown and described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims.

What is claimed is:

1. A lamp adjuster comprising:
    an input shaft having a threaded portion and a drive extension with a drive head, the input shaft adapted to be mounted directly to a lamp assembly;
    a ball stud bracket in threaded engagement with the input shaft, the ball stud bracket adapted to be mounted directly to a lamp assembly and having a single main body, a shaft bracket disposed at a first end of the main body, and a ball stud extension including a ball stud disposed at a second end of the main body, and wherein the ball stud on the ball stud extension and the drive head on the input shaft extend in substantially the same direction away from the main body of the ball stud bracket; and
    wherein rotation of the input shaft causes linear translation of the ball stud extension in a direction parallel to a longitudinal axis of the input shaft.

2. The lamp adjuster of claim 1, furthur comprising an o-ring supported on the ball stud extension.

3. The lamp adjuster of claim 1, wherein the shaft bracket includes an arcuate section with a threaded interior.

4. The lamp adjuster of claim 1, wherein the shaft bracket includes a clutching feature.

5. The lamp adjuster of claim 1, wherein the input shaft has longitudinal grooves and protrusions.

6. The lamp adjuster of claim 1, wherein the ball stud bracket includes a plurality of channel supports.

7. The lamp adjuster of claim 1, wherein the ball stud extension and shaft bracket are integrally formed on the ball stud bracket.

8. A lamp assembly comprising:
    a housing including an integrally formed walled opening and a plurality of integrally formed mounting tabs;
    a lens supported by the housing;
    a reflector supported by the housing;
    a bulb disposed between the lens and the reflector; and
    an adjuster functionally engaged to the reflector, the adjuster including an input shaft functionally engaging a ball stud bracket, the ball stud bracket secured within the walled opening of the housing and the input shaft and the ball stud bracket supported by the plurality of mounting tabs; and
    wherein rotation of the input shaft causes linear translation of the ball stud bracket in a direction parallel to a longitudinal axis of the input shaft.

9. The lamp assembly of claim 8, further comprising a ball stud extension disposed at one of the ball stud bracket and a shaft bracket disposed at another end of the ball stud bracket.

10. The lamp assembly of claim 9, wherein the ball stud extension includes a ball stud that functionally engages the reflector.

11. The lamp assembly of claim 8, wherein the input shaft includes a snap feature that secures the input shaft to one of the plurality of mounting tabs.

12. The lamp assembly of claim 8, further comprising an o-ring to create a seal between the walled opening of the housing and the ball stud bracket.

13. The lamp assembly of claim 8, wherein a portion of the ball stud bracket can flex outwardly in response to excessive resistance to linear movement.

* * * * *

UNITED STATES PATENT AND TRADEMARK OFFICE
CERTIFICATE OF CORRECTION

PATENT NO. : 7,284,887 B2  
APPLICATION NO. : 11/222503  
DATED : October 23, 2007  
INVENTOR(S) : Scott Fladhammer Page 1 of 1

It is certified that error appears in the above-identified patent and that said Letters Patent is hereby corrected as shown below:

Column 6,  
Line 44, the word --end-- should be added after the word "one"

Signed and Sealed this

Eighth Day of April, 2008

JON W. DUDAS  
*Director of the United States Patent and Trademark Office*